Jan. 16, 1962 E. A. QUADE 3,017,617

MAGNETIC TRANSDUCER

Filed July 31, 1956 2 Sheets-Sheet 1

INVENTOR.
EDWARD A. QUADE

BY John B. Clark

ATTORNEY

United States Patent Office 3,017,617
Patented Jan. 16, 1962

3,017,617

MAGNETIC TRANSDUCER

Edward A. Quade, San Jose, Calif., assignor to International Business Machines Corporation, New York, N.Y., a corporation of New York Filed July 31, 1956, Ser. No. 601,200
12 Claims. (Cl. 340—174.1)

The present invention pertains generally to magnetic recording and relates more particularly to magnetic transducers and matrices thereof.

Where multiple magnetic transducers are employed in a magnetic recording system, high speed selection of a given transducer is conventionally accomplished by independent electronic or saturable reactor gates, and in either case a separate gate is required for each transducer. The present invention is directed to a magnetic transducer wherein the gating function is performed within the transducer itself, thereby reducing the cost and complexity of the switching system.

Thus, it is one object of the present invention to provide an improved magnetic transducer.

Another object is to provide a magnetic transducer capable of internal gating.

A further object is to provide an improved matrix of magnetic transducers having a simplified switching and gating structure for operating the matrix.

According to the invention, means are provided for selectively saturating a portion of the magnetic circuit of a transducer for affecting the operability thereof, thereby providing the desired gating function within the transducer itself.

Still another object, therefore, is to provide a transducer which is selectively saturable for controlling the operability thereof.

Other objects of the invention will be pointed out in the following description and claims and illustrated in the accompanying drawings, which disclose, by way of example, the principle of the invention and the best mode which has been contemplated of applying that principle.

Figure 2:
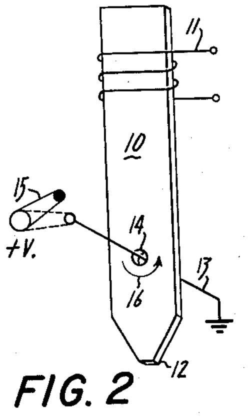
FIGS. 2 through 8 are perspective views of several embodiments of the transducer of the invention.
Figures 8, 9:
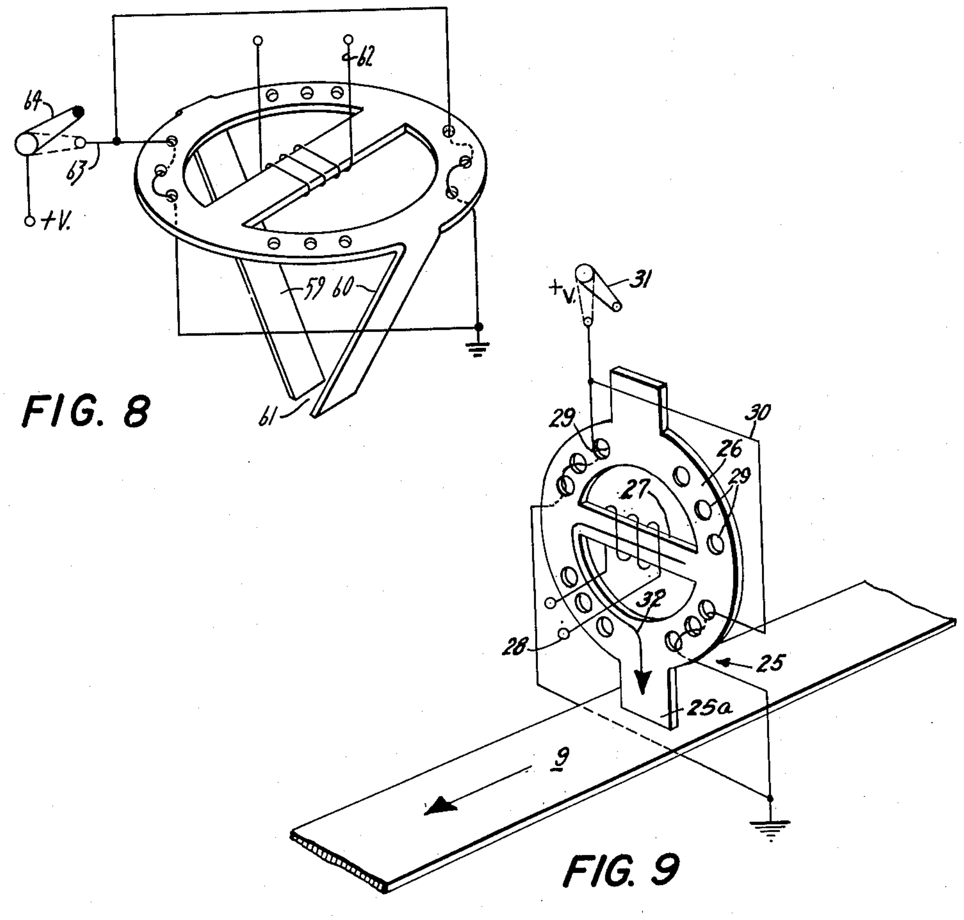
FIG. 9 is a perspective view of one embodiment of the invention arranged to cooperate with a magnetic tape.

In its simplest form, the transducer of the invention comprises a probe 10 (FIG. 2) having an excitation winding 11 across which writing voltages are placed when recording on a suitable magnetic record surface such as the tape 9 shown in FIG. 9, associated with the lower tip 12 (FIG. 2) of the probe. Similarly, when reading information from the record, the signals are taken from the winding 11. The probe 10 is additionally provided with a control winding 13 which extends through an opening 14 provided therefor intermediately of the winding 11 and the tip 12. The winding 13 is connected between ground and +V through a switch 15, and when the switch is closed, current flow in the winding 13 induces a magnetic field in the probe, as indicated by an arrow 16, which field is sufficient to saturate a section of the probe adjacent the opening 14, thereby blocking the passage of flux induced in the probe by the winding 11 between the winding and the probe tip 12. When the switch 15 is open, however, that portion of the probe adjacent the hole 14 is no longer saturated and the flux is free to pass between the winding 11 and the probe tip 12. Thus, when it is desired to record, for example, the writing voltage is placed across the winding 11 and the switch 15 is opened, thereby permitting the flux induced in the probe due to the excitation of the winding 11 to pass downwardly from the tip 12 to the record. This results in magnetizing the record surface according to the writing voltage. Similarly, when it is desired to read data stored in the record, the switch 15 is opened and the flux resulting from the data stored on the record enters the tip 12 and passes through the probe 10, thereby inducing a voltage in the winding 11. When it is desired that the transducer be inoperative either to read or to record, it will be understood that the switch 15 is closed, thereby saturating the portion of the probe adjacent the hole 14, which prevents the passage of flux therethrough.

Figure 3:
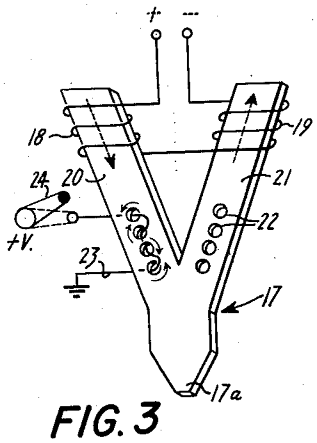

Referring to FIG. 3, the embodiment of the invention there shown comprises a V-shaped transducer 17 having a probe tip 17*a* and excitation windings 18 and 19 associated with legs 20 and 21 of the probe. The windings are connected in series aiding and each leg is provided with four holes 22 and a winding 23 is threaded through the holes in one leg, substantially as shown in the drawing. The winding 23 is connected between ground and through a switch 24 to +V, and when the switch 24 is closed, the portion of the leg 20 adjacent the holes 22 therein is saturated due to the magnetic field set up by the current flow through the winding 23.

It was mentioned above that the windings 18 and 19 are connected in series aiding. The magnetic circuit in each leg 20 and 21 is balanced, and when a writing voltage is placed across the excitation windings 18 and 19, the net flux present in the probe tip 17*a* is zero, as long as the switch 24 is open, since the flux generated by each winding is attracted by the other winding. If, however, the switch 24 is closed, thereby saturating the leg 20 intermediately of the winding 18 and the probe tip 17*a*, the leg 20 is, in effect, removed, thereby unbalancing the circuit and permitting the flux generated by the winding 19 to cause magnetic recordation according to the writing voltage.

Similarly, when reading, the flux generated by the data stored magnetically in the record enters the probe tip and also enters each leg 20 and 21, as long as the switch 24 is open. Due to the symmetry of the circuit the voltages induced in the windings 18 and 19 cancel each other, and the resultant signal output is zero. When the switch 24 is closed, however, all the flux entering the probe tip passes through the leg 21, the leg 20 being saturated, thereby unbalancing the circuit and causing a signal voltage representative of the sensed data to appear across the windings 18 and 19. Thus, read-in or read-out is possible only when the switch 24 is closed, and when it is desired to render the transducer inoperative the switch 24 is opened. Before proceeding, it should be noted that the transducer may also be rendered inoperative by threading another winding 23' (not shown) through the holes 22 in the leg 21 and by energizing both of the control windings. In this way each leg is blocked and any leakage flux is cancelled in the excitation winding.

Another embodiment of the invention (FIGS. 4 and 9) comprises a transducer 25 having a ring-shaped portion 26 and a bar 27 formed integrally with the ring 26 and extending across the central opening thereof, as shown in the drawing. An excitation winding 28 is wound around the bar 27 and three holes 29 are provided in each quadrant of the ring. Six of the holes are arranged to receive a control winding 30 connected, as shown, between ground and +V to a switch 31, the remaining holes 29 being provided to balance the circuit magnetically. When the switch 31 is open, writing voltages placed across the winding 28 do not cause magnetic recordation since the flux generated thereby is short-circuited magnetically. When the switch 31 is closed, however, those portions of the ring 26 adjacent the holes 29 through which the winding 30 passes are saturated and the flux generated in the bar 27 due to a writing voltage placed across the winding 28 follows the path indicated by an arrow 32 from where it exits from the lower tip 25a of the transducer to the magnetic record 9 disposed therebeneath. Similarly, the flux generated by the information stored magnetically in the record 9 and entering the lower tip of the transducer is effective to induce a voltage in the winding 28 only if the switch 31 is closed since otherwise the winding 28 is short-circuited magnetically.

Figure 5:
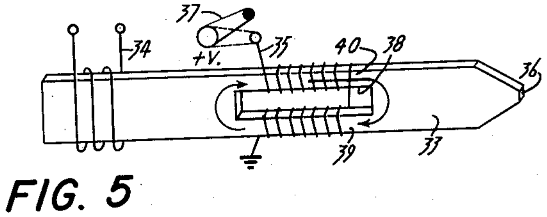

The transducer shown in FIG. 5 comprises a probe 33 having an excitation winding 34 and a control winding 35 disposed intermediately of the excitation winding and the probe tip 36. The control winding 35 is connected between ground and through a switch 37 to +V. Referring to the drawing, it will be noted that a rectangular hole 38 is provided in the probe 33 and that one half of the control winding 35 is wrapped around one leg 39 formed in the probe by the hole 38, the other half thereof being wrapped around the other leg 40. When the switch 37 is closed, thereby energizing the control winding 35, the portion of the probe adjacent the hole 38 is saturated, thereby rendering the transducer ineffective. Additionally, when the switch 37 is open, the transducer is effective for reading or writing as described above.

Each of the various embodiments described above in connection with FIGS. 2 through 5 represents a transducer employing the teaching of this invention, which transducer is adapted for perpendicular magnetic recording, as opposed to longitudinal magnetic recording, and it will be understood that various other forms of the "perpendicular" type of transducer which employ this invention will be obvious to those skilled in the art. Similarly, the longitudinal types of transducer disclosed in FIGS. 6, 7 and 8 represent only a few of many possible configurations, and the present invention is not limited to the forms as specifically shown.

Figure 7:
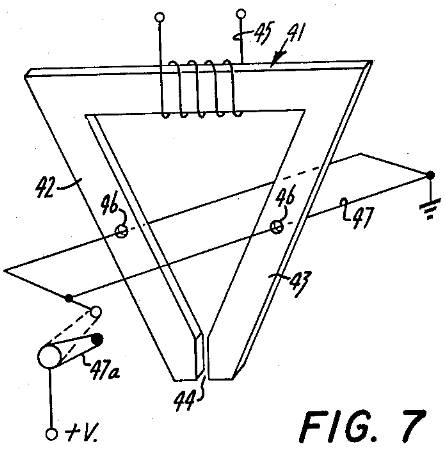

Referring first to FIG. 7, a delta-type transducer 41 having legs 42 and 43 and an air gap 44 is shown. An excitation winding 45 is provided and a hole 46 is present in each leg 42 and 43. A control winding 47 connects between ground and through each hole 46 to one side of a switch 47a, the other side of the switch being connected to +V. As discussed above, the control winding 47 is adapted to saturate those portions of each leg 42 and 43 adjacent the holes 46 when the switch 47a is closed, thereby preventing the passage of flux to or from the excitation winding 45. Thus, when the switch 47a is closed, the transducer is inoperative for reading or recording, being operative only while the switch 47a is open since at this time, and only at this time, can flux pass to or from the excitation winding.

Figure 6:
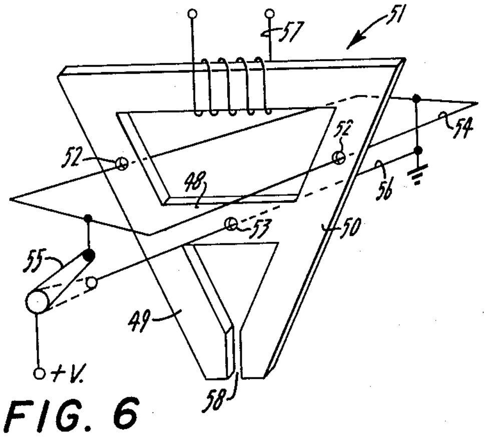

The embodiment of the invention shown in FIG. 6 is similar to that discussed above in connection with FIG. 7; however, a cross bar 48 magnetically connects the two legs 49 and 50 of a delta-type transducer 51. Two holes 52, which correspond to the holes 46 of the transducer shown in FIG. 7, are disposed intermediately of the cross bar 48 and the top portion of the transducer 51. Additionally, a hole 53 is provided in the bar 48. It will be noted that a control winding 54 connects between ground and through the holes 52 to +V through a switch 55, another control winding 56 being arranged between ground and through the hole 53 and switch 55 to +V. The windings 54 and 56 are energized alternately, i.e., when the winding 54 is energized the winding 56 is deenergized, and vice versa.

When an excitation winding 57 is energized by placing a writing voltage thereacross and when the switch 55 is in the full-line position shown in the drawing, those portions of the legs 49 and 50 adjacent the holes 52 are saturated, thereby preventing the passage of flux induced in the legs to a gap 58 provided between the legs 49 and 50. It should be noted that any leakage of flux that might happen to bypass the holes 52 is short-circuited by the bar 48 since at this time the winding 56 is deenergized. Similarly, when the switch 55 is in the full-line position, the flux entering the legs 49 and 50 from the record with which the transducer cooperates is shorted by the bar 48 and is adidtionally prevented from reaching the winding 57 due to the saturation mentioned above.

When it is desired to render this transducer operative, the switch 55 is thrown to the dotted-line position, thereby energizing the winding 56 and deenergizing the winding 54. Under this condition, the bar 48 is saturated, thereby removing the short circuit mentioned above, and those portions of the legs 49 and 50 adjacent the holes 52 are no longer saturated, thereby permitting the passage of flux between the gap of the transducer and the winding 57 for recording or reading.

Figure 4:
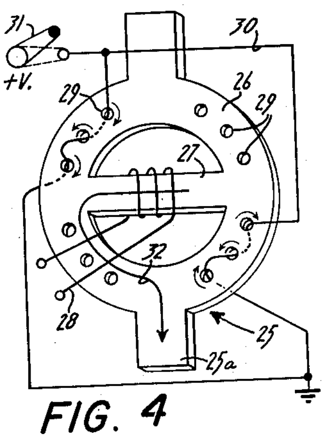

The embodiment shown in FIG. 8 is substantially identical to that shown in FIG. 4 with the exception that it is adapted to "longitudinal" recording as opposed to "perpendicular" recording. This is accomplished by bending two tips 59 and 60 thereof to form a gap 61 therebetween. Like the structure shown in FIG. 4, an excitation winding 62 and a control winding 63 are provided. Further discussion is not deemed necessary in that its operation is substantially identical to that discussed above, and when a switch 64 is closed, it will be clear that reading or recording may be consummated, these operations being prevented as long as the switch 64 is open.

Figure 1:
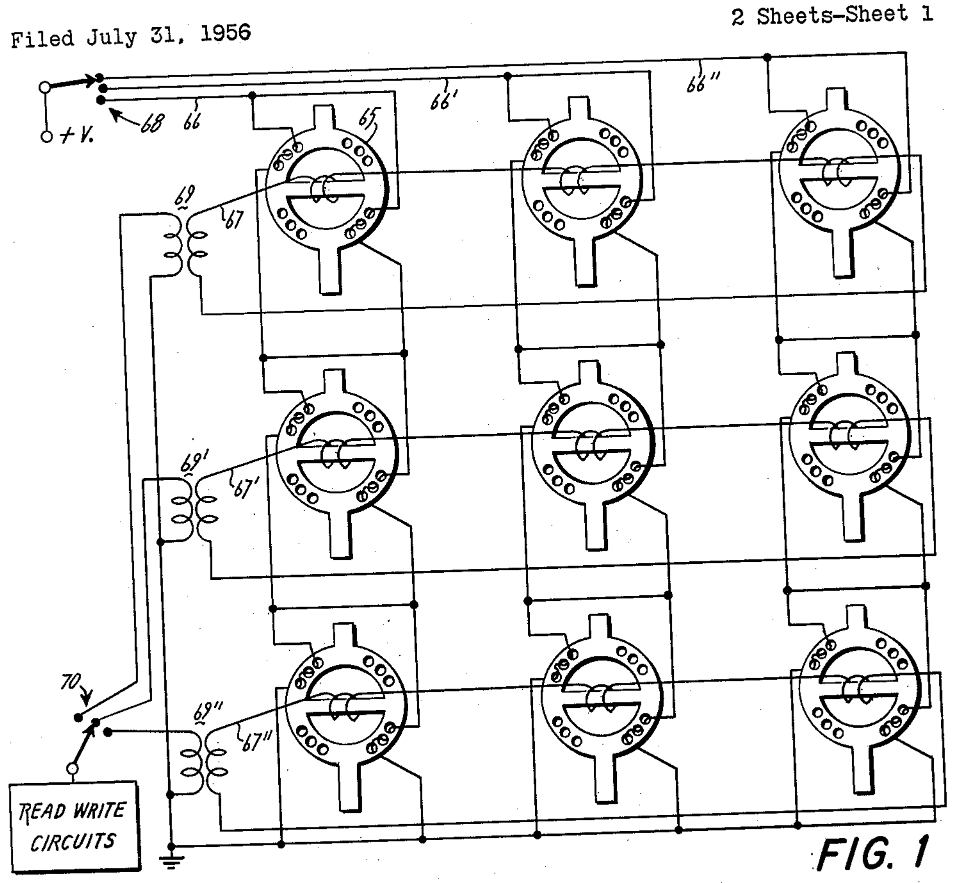
FIG. 1 is a schematic diagram of an embodiment of the novel matrix of the invention.

It was mentioned early in the specification that the transducer of the invention permits construction of a simplified matrix wherein gating functions are provided within the transducer. Referring now to FIG. 1, a number of transducers 65 are arranged in a matrix according to the invention. The particular transducer shown is of the form shown in FIG. 4 discussed earlier; however, it will be clear that any transducer utilizing the present invention may be employed. Nine transducers 65 are shown although any convenient number may be used. The transducers are arranged in columns and rows, there being three of each. The transducers of each column have a common control winding 66, 66′, 66″, the transducers of each row having a common excitation winding 67, 67′, 67″. The three control windings are connected to corresponding contacts of a switch 68, the armature of which is connected to +V, and the other end of each of these windings is connected to ground. Similarly, each of the three excitation windings is connected through a corresponding transformer 69, 69′, 69″ to a corresponding contact of a switch 70. The armature of the switch is connected to the read-write circuits associated with the matrix.

As discussed above, these transducers are rendered operative by energizing the control winding associated therewith, and assuming, for example, that the switch 68 is in the position shown in the drawing, it will be clear that the column of transducers associated with the control winding 66″ is rendered operative. Selection of a given transducer in the column is then made by setting the switch 70 to the proper contact. Assuming further that it is desired to read data associated with the center transducer in this column, the switch 70 is set to the position indicated in the drawing, thereby connecting the read-write circuits through the transformer 69′ to the excitation winding of each of the transducers in the middle row. Since only the end transducer in the present example is operative, it will be clear that the signal appearing across the transformer 69′ will be that associated with the selected transducer. In this way any transducer in the matrix is selected according to the condition of the switches 68 and 70, the switch 68 being adapted to select the column and the switch 70 being adapted to select the row.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magnetic transducer for selectively recording on and reproducing from a magnetic recording medium in the form of magnetized areas thereon, comprising a magnetic core member having a first portion with one end terminating adjacent said magnetic recording medium and second and third portions branching from the other end of said first portion to provide a low reluctance magnetic circuit between said recording medium and said portions, said second and third portions each having a plurality of apertures therethrough intermediate the ends thereof, a winding disposed between said second and third portions to translate magnetic flux between said recording medium and said winding, a control conductor arranged in the apertures of said second portion, and means to pass an electric current through said conductor for selectively controlling the passage of flux between said recording medium and said winding.

2. A magnetic transducer for selectively recording on and reproducing from a magnetic recording medium in the form of magnetized areas thereon comprising a magnetic core member having a first portion, second and third portions depending from opposite ends of said first portion and terminating adjacent said magnetic recording medium to provide a low reluctance magnetic circuit between said first portion and said recording medium, each of said second and third portions having at least one aperture therethrough intermediate the ends thereof, a winding disposed on said first portion to translate magnetic flux between said recording medium and said winding and a control conductor arranged in an aperture of said second portion, and means to pass an electric current through said conductor for selectively controlling the passage of flux between said recording medium and said winding.

3. A magnetic transducer as defined in claim 2 wherein said second and third portions are arranged to form a gap adjacent said recording medium.

4. A magnetic transducer as defined in claim 3 and incorporating a fourth core portion bridging said second and third portions and having at least one aperture therein, a further control conductor arranged in the last said aperture, and means to pass an electric current through said further control conductor in the absence of current through the first said control conductor.

5. A magnetic transducer for selectively recording on and reproducing from a magnetic recording medium in the form of magnetized areas thereon, comprising a magnetic core member having an annular portion, a cross bar portion diametrically disposed of said annular portion and two tip portions extending radially and externally of said annular portion on opposite sides thereof substantially normal with respect to said cross bar portion with one of said tip portions positioned adjacent said recording medium, there being a plurality of apertures in each quarter of said annular portion defined by the intersections between the annular portion and the cross bar portion and the tip portions, a winding disposed on said cross bar portion, control conductors arranged in the apertures of opposing quadrants, and means to pass electric currents through said control conductors for controlling the passage of magnetic flux between said recording medium and said winding.

6. A magnetic transducer for selectively recording on and reproducing from a magnetic recording medium in the form of magnetized areas thereon, comprising a magnetic core member having an annular portion, a cross bar portion diametrically disposed of said annular portion and two tip portions extending radially and externally of said annular portion on opposite sides thereof substantially normal with respect to said cross bar portion with both of said tip portions arranged to form a gap adjacent said recording medium, there being a plurality of apertures in each quarter of said annular portion defined by the intersections between the annular portions and the cross bar portions and the tip portions, a winding disposed on said cross bar portion, control conductors arranged in the apertures of opposing quadrants, and means to pass electric currents through said control conductors for controlling the passage of magnetic flux between said recording medium and said winding.

7. In combination, a magnetic recording medium for storing information signals in the form of magnetized areas thereon, a plurality of transducers cooperating with corresponding areas of said recording medium and arranged in columns and rows, each of said transducers comprising a magnetic core member having a first, a second and a third portion connected together, said third portion terminating adjacent said magnetic recording medium to provide a low reluctance magnetic circuit between said first portion and said recording medium, said second portion having at least one aperture therethrough intermediate the ends thereof, a winding disposed on said first portion to translate magnetic flux between said recording medium and said winding, a control conductor arranged in an aperture of said second portion, a reading and writing circuit arranged to be connected selectively to all of said windings in each row of said transducers, and means selectively to pass electric currents through said control conductors in each column of said transducers, thereby to select but one of said transducers for translating information between said reading and writing circuit and said recording medium.

8. In combination, a magnetic recording medium for storing information signals in the form of magnetized areas thereon, a plurality of transducers cooperating with corresponding areas of said recording medium and arranged in columns and rows, each of said transducers comprising a magnetic core member having an annular portion, a cross bar portion diametrically disposed of said annular portion and two tip portions extending radially and externally of said annular portion on opposite sides thereof substantially normal with respect to said cross bar portion with one of said tip portions positioned adjacent said recording medium, there being a plurality of apertures in each quarter of said annular portion defined by the intersections between the annular portion and and the cross bar portion and the tip portions, a winding disposed on said cross bar portion, control conductors arranged in the apertures of opposing quadrants, a reading and writing circuit arranged to be connected selectively to all of said windings in each row of said transducers, and means selectively to pass electric currents through said control conductors in each column of said transducers, thereby to select but one of said transducers for translating information between said reading and writing circuit and said recording medium.

9. A magnetic transducer in the form of a magnetic flux bridge comprising four arms of magnetic core material having at least one aperture each therethrough and arranged in end-to-end relationship to form a closed loop, a diagonal of magnetic core material subtending said loop between opposing junctions of said arms of the loop, a tip portion of magnetic core material arranged at one of the other junctions of said arms, a winding disposed on said diagonal, conductors arranged in the apertures of opposing arms of said loop, and means to pass electric current through said conductors to control the passage of magnetic flux between said tip portion and said diagonal.

10. A magnetic transducer in the form of a magnetic flux bridge comprising four arms of magnetic core material arranged in end-to-end relationship to form a closed loop, and each arm having apertures therethrough, a diagonal of magnetic core material subtending said loop between opposing junctions of said arms of the loop, tip portions of magnetic core material arranged at the other junctions of said arms to form the remaining diagonal of the bridge, a winding disposed on said diagonal, conductors arranged in the apertures of opposite arms of said loop, and means to pass electric current through said conductors to control the passage of magnetic flux between said tip portions and the first said diagonal.

11. A magnetic transducer for selectively recording on and reproducing from a magnetic recording medium in the form of magnetized areas thereon, comprising a magnetic core member in the form of a magnetic flux bridge comprising four arms of magnetic core material having apertures therethrough and arranged in end-to-end relationship to form a closed loop, a diagonal of magnetic core material subtending said loop between opposing junctions of said arms of the loop, a tip portion of magnetic core material arranged at one of the other junctions of said arms and adjacent said recording medium, a winding disposed on said diagonal, conductors arranged in the apertures of opposing arms of said loop, and means to pass electric current through said conductors to control the passage of magnetic flux between said recording medium and said winding on said diagonal.

12. A magnetic transducer for selectively recording on and reproducing from a magnetic recording medium in the form of magnetized areas thereon, comprising a magnetic core member having a first, a second and a third portion, said first portion terminating adjacent said magnetic recording medium to provide a low reluctance magnetic circuit between said third portion and said recording medium, said second portion being arranged between said first and third portions and having at least one aperture therethrough intermediate the ends thereof, a winding disposed on said third portion to translate magnetic flux between said recording medium and said winding, a control conductor arranged in said aperture of said second portion, and means for selectively passing an electric current through said conductor of value at which the passage of flux between said recording medium and said winding is substantially completely blocked.

References Cited in the file of this patent

UNITED STATES PATENTS

| | | |
|---|---|---|
| 2,708,219 | Carver | May 10, 1955 |
| 2,708,693 | Hendrickson | May 17, 1955 |
| 2,719,965 | Person | Oct. 4, 1955 |
| 2,822,533 | Duinker et al. | Feb. 4, 1958 |
| 2,842,755 | Lamy | July 8, 1958 |
| 2,953,739 | Duinker | Sept. 20, 1960 |
| 2,966,666 | Raymond | Dec. 27, 1960 |

FOREIGN PATENTS

| | | |
|---|---|---|
| 881,089 | Germany | June 25, 1953 |
| 1,117,701 | France | May 25, 1956 |
| 776,401 | Great Britain | June 5, 1957 |

OTHER REFERENCES

"Magnistor Circuits," by Richard L. Snyder, Electronics Design, Aug. 1955, pp. 24–27.